(12) United States Patent
Hooper et al.

(10) Patent No.: US 11,699,462 B2
(45) Date of Patent: Jul. 11, 2023

(54) METHOD, APPARATUS AND COMPUTER PROGRAM

(71) Applicant: SONY CORPORATION, Tokyo (JP)

(72) Inventors: Daniel Luke Hooper, Surrey (GB); Robert Mark Stefan Porter, Winchester (GB)

(73) Assignee: SONY CORPORATION, Tokyo (JP)

( * ) Notice: Subject to any disclaimer, the term of this patent is extended or adjusted under 35 U.S.C. 154(b) by 0 days.

(21) Appl. No.: 17/272,529

(22) PCT Filed: Jan. 20, 2020

(86) PCT No.: PCT/GB2020/050118
§ 371 (c)(1),
(2) Date: Mar. 1, 2021

(87) PCT Pub. No.: WO2020/152450
PCT Pub. Date: Jul. 30, 2020

(65) Prior Publication Data
US 2021/0327470 A1    Oct. 21, 2021

(30) Foreign Application Priority Data

Jan. 22, 2019    (GB) ...................................... 1900866

(51) Int. Cl.
*G11B 27/031*    (2006.01)
*H04N 5/268*    (2006.01)
(Continued)

(52) U.S. Cl.
CPC ........... *G11B 27/031* (2013.01); *H04N 5/268* (2013.01); *H04N 23/661* (2023.01); *H04L 67/10* (2013.01)

(58) Field of Classification Search
CPC .. G11B 27/031; H04N 5/23206; H04N 5/268; H04N 21/854; H04L 67/10
(Continued)

(56) References Cited

U.S. PATENT DOCUMENTS

2010/0260468 A1    10/2010    Khatib et al.
2012/0320196 A1    12/2012    Overton et al.
(Continued)

FOREIGN PATENT DOCUMENTS

EP    2 242 057 A2    10/2010
WO    WO 2018/023199 A1    2/2018

OTHER PUBLICATIONS

International Search Report dated May 13, 2020 in PCT/GB2020/050118 filed Jan. 20, 2020.

*Primary Examiner* — Loi H Tran
(74) *Attorney, Agent, or Firm* — Oblon, McClelland, Maier & Neustadt, L.L.P.

(57) ABSTRACT

A method of providing edited media content is described. The method comprises: generating captured content and a representation of the captured content, the representation of the captured content having a smaller size than the captured content; providing the captured content over a first network path across a network and the representation of the captured content over a second network path across the network, the first network path having a higher latency than the second network path; generating an edited version of the received representation of the captured content; and providing an edited version of the captured content, the editing of the captured content being based on the editing of the representation of the captured content.

11 Claims, 15 Drawing Sheets

(51) Int. Cl.
*H04N 23/661* (2023.01)
*H04L 67/10* (2022.01)

(58) Field of Classification Search
USPC .......................................... 348/159
See application file for complete search history.

(56) References Cited

U.S. PATENT DOCUMENTS

| | | | |
|---|---|---|---|
| 2015/0341559 A1* | 11/2015 | Kelder | H04N 5/23219 |
| | | | 348/220.1 |
| 2017/0257674 A1 | 9/2017 | Horita | |
| 2017/0337912 A1 | 11/2017 | Caligor et al. | |
| 2017/0345459 A1 | 11/2017 | Manville et al. | |
| 2018/0262659 A1* | 9/2018 | Hegde | H04N 5/23203 |
| 2019/0341079 A1 | 11/2019 | Manville et al. | |
| 2020/0162794 A1* | 5/2020 | Nishino | H04L 41/22 |
| 2020/0196195 A1* | 6/2020 | Tang | H04L 1/08 |
| 2021/0235137 A1* | 7/2021 | Shen | H04N 21/23439 |
| 2021/0311910 A1* | 10/2021 | Calveley | G06F 16/7867 |

* cited by examiner

METHOD, APPARATUS AND COMPUTER PROGRAM

BACKGROUND

Field of the Disclosure

The present invention relates to a method, apparatus and computer program.

Description of the Related Art

The "background" description provided herein is for the purpose of generally presenting the context of the disclosure. Work of the presently named inventors, to the extent it is described in the background section, as well as aspects of the description which may not otherwise qualify as prior art at the time of filing, are neither expressly or impliedly admitted as prior art against the present invention.

It is now possible to perform live editing of media content using a cloud service such as Sony's Virtual Production service. In this service, media content (such as audio and/or video content) is captured at an event and is sent over a network, such as a cellular network, to a server. This content may be high definition content, 4K content, or 8K content or the like. Consequently, this captured content requires large amounts of bandwidth and so requires large amounts of network resource.

In addition to the captured content, a representation of the captured content is also sent over the network. A production team accesses the representation of the captured content from the server using a laptop computer, tablet computer, smartphone or the like. The captured content is edited within the server based on the representation of the captured content and the edited captured content is provided to consumers via a broadcast method (such as terrestrial, satellite or cable television), or via live streaming services such as by Facebook®, YouTube® or the like.

Whilst these types of new services are game-changers, further improvements are being sought.

It is desirable in a system that performs live editing to reduce the time delay between the content being captured and the content being edited. By having a reduced time delay enables more real-time feedback amongst a distributed production crew.

It is at least an aim of the present disclosure to address this issue.

SUMMARY

According to one aspect of the present disclosure, there is provided a method of providing edited media content comprising: generating captured content and a representation of the captured content, the representation of the captured content having a smaller size than the captured content; providing the captured content over a first network path across a network and the representation of the captured content over a second network path across the network, the first network path having a higher latency than the second network path; generating an edited version of the received representation of the captured content; and providing an edited version of the captured content, the editing of the captured content being based on the editing of the representation of the captured content.

Other embodiments and features are provided in the appended claims.

The foregoing paragraphs have been provided by way of general introduction, and are not intended to limit the scope of the following claims. The described embodiments, together with further advantages, will be best understood by reference to the following detailed description taken in conjunction with the accompanying drawings.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings, wherein.

DESCRIPTION OF THE EMBODIMENTS

Figure 1:
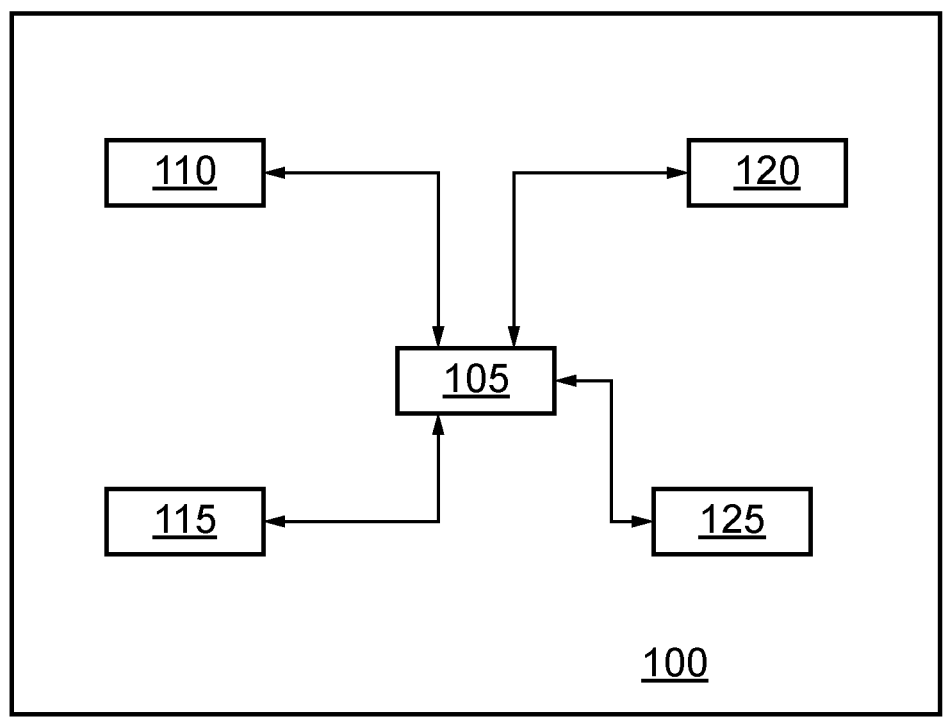
FIG. 1 shows a camera 100 according to embodiments of the disclosure.

Referring now to the drawings, wherein like reference numerals designate identical or corresponding parts throughout the several views.

FIG. 1 describes a camera 100 according to embodiments of the disclosure. The camera comprises a camera processor 105. The camera processor 105 may consist of circuitry that is arranged to run computer software in order to control the operation of the camera 100. For example, the camera processor 105 may be a microprocessor or an Application Specific Integrated Circuit (ASIC) or any kind of appropriate circuitry.

Additionally connected to the camera processor 105 is camera control circuitry 125. The camera control circuitry 125 receives an input from a user via a touchscreen or physical buttons or the like.

The camera processor 105 is connected to camera storage 110. The camera storage may be integrated with the camera 100 or may be an external memory card that is inserted into the camera 100 during operation or any combination thereof. It is envisaged that the camera storage 110 will store the computer program and computer instructions which will be used by the camera processor 105 to control the operation of the camera 100. The camera storage 110 will, in embodiments, act as a buffer storing at least temporarily, content as will be explained later.

Additionally connected to the camera processor 105 is camera communication circuitry 120. The camera communication circuitry 120 communicates with server 200 (as will be explained in FIG. 2) over a network. The network may be a wired network or may be a wireless network such as a telecommunications network operating using Long-Term Evolution (LTE) standards. The camera communication circuitry 120 communicates images and sound captured by camera 100 to the server 200 over the network.

Additionally connected to the camera processor 105 is camera control circuitry 115. The camera control circuitry 115 receives control instructions over the network via the camera communication circuitry 120 and controls the operation of the camera 100 in accordance with the received control information. For example, the control information may include signalling to control the pitch, pan and zoom of the lens arrangement using which the camera 100 captures the images. Instead of, or in addition, the camera control circuitry 115 may receive audio data from the server 200 of the producer instructing a camera operator to perform various functions. For example, the producer may instruct the camera operator to capture a different part of the scene or alter the zoom settings on the camera 100 manually.

Figure 2:
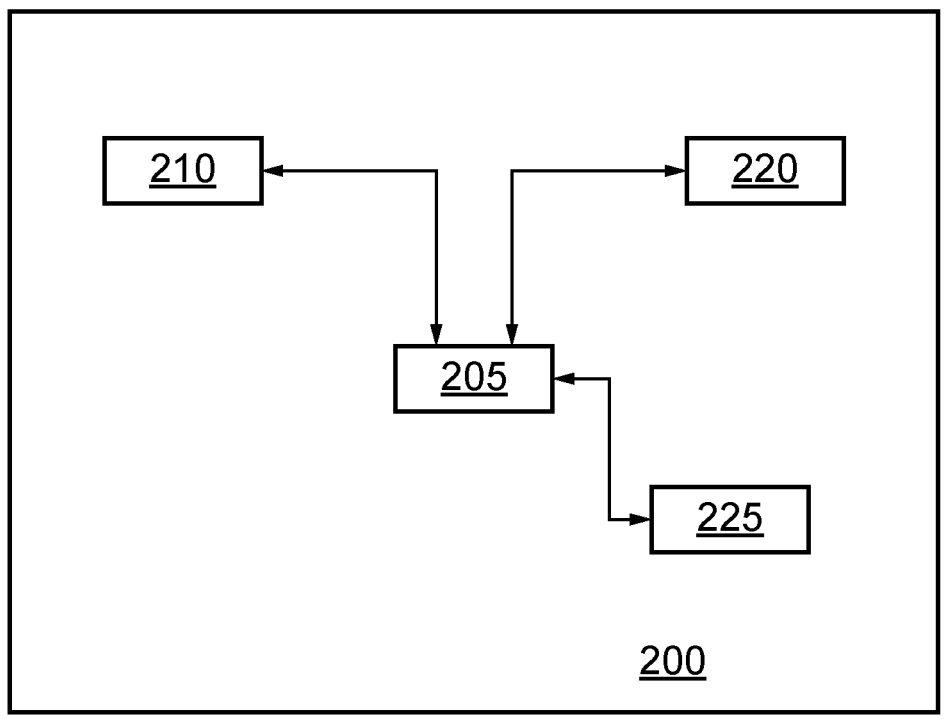
FIG. 2 shows a server 200 according to embodiments of the disclosure.

FIG. 2 shows a server according to embodiments of the disclosure. The server 200 comprises a server processor 205. The server processor is circuitry that controls the operation of the server 200. The server processor 205 may therefore be an Application Specific Integrated Circuit or microprocessor that runs computer readable instructions in order to perform the embodiments of the disclosure.

Additionally connected to the server processor 205 is server storage 210. The server storage 210 may be embodied as solid state storage or magnetically readable storage and contains the software instructions that are used to control the server processor 205. In addition, the server storage 210 may also include the images and/or audio captured by the camera 100. The images/audio stored in server storage 210 are received from the camera 100 by the server communication circuitry 220. The server communication circuitry 220 is connected to the server processor 205 and is circuitry that communicates with the camera 200 over the network. The network, as explained with reference to FIG. 1, may be a telecommunications network complying with the LTE standard or any more recent 3GPP or similar Standard.

Additionally connected to the server processor 205 is server control circuitry 225. The server control circuitry 225 receives an input from a user. The user may provide an input to control editing using a Graphical User Interface similar to that explained with reference to FIG. 3 or may provide audio input to transfer via the server communication circuitry 220 verbal instructions to an operator of camera 100 in order that the camera operator controls the camera 100 in a particular way in order to capture audio/video used in the final broadcast content.

Figure 3:
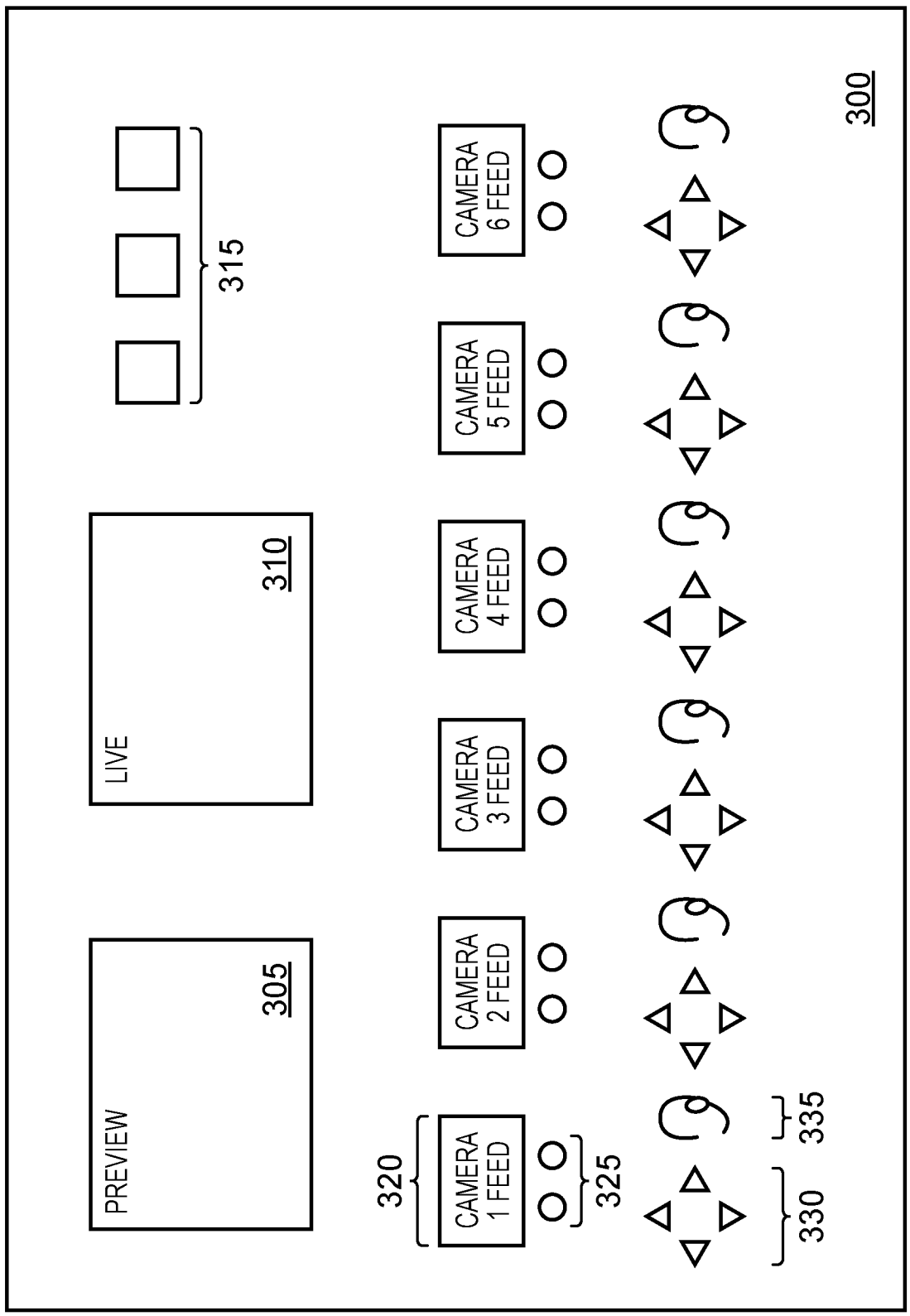
FIG. 3 shows a Graphical User Interface for a user connected to the server 200.

FIG. 3 shows a Graphical User Interface that a user connected to the server 200 may use. The server 200 may be controlled by a user connecting a laptop computer or a tablet or the like to the server 200 via the server control circuitry 225. When connected, the user of the server who may be producer will be presented with the user interface 300. The user interface contains a preview screen 305 of media content which in embodiments is audio and/or video content (herein after referred to as audio/video content). However, it is envisaged that the media content may also include still images or any kind of media content. The preview screen 305 shows a preview screen of what the live stream could look like with the editing selected by the user applied to the camera feed. The user interface 300 also includes a live view 310 of the content currently being distributed across a network such as a broadcast network or over the Internet to various feeds such as Facebook® or YouTube®.

Also shown are 6 camera feeds 320. Each camera feed is a representation of the content captured by each camera. In other words, each camera feed shows a lower resolution representation of the captured content so that the editor controlling the interface 300 may edit the content using the editing functions 315 to generate a live screen shown in section 310. Typically, the lower resolution representation will be smaller in size (i.e. be comprised of fewer pixels), but the disclosure is not so limited. Below each camera feed 320 is a highlight section 325. This provides a visual indication to the user to show which camera feed is currently being broadcast live in feed 310. For example, where a camera feed is being broadcast, the indicator 325 may appear green.

In addition, below each camera feed are direction arrows 330. The direction arrows allow the operator of the user interface 300 to adjust the pitch, tilt, pan and zoom of camera 100 remotely. These controls are provided using control signals which are sent from the server 200 to the camera 100. Finally, a talk icon 335 is shown which allows the producer controlling server 200 to communicate directly with the operator of camera 100. In other words, this allows the producer to communicate directly with the camera operator to perform various functions with the camera such as changing the captured scene or the camera parameters manually.

Figure 4:
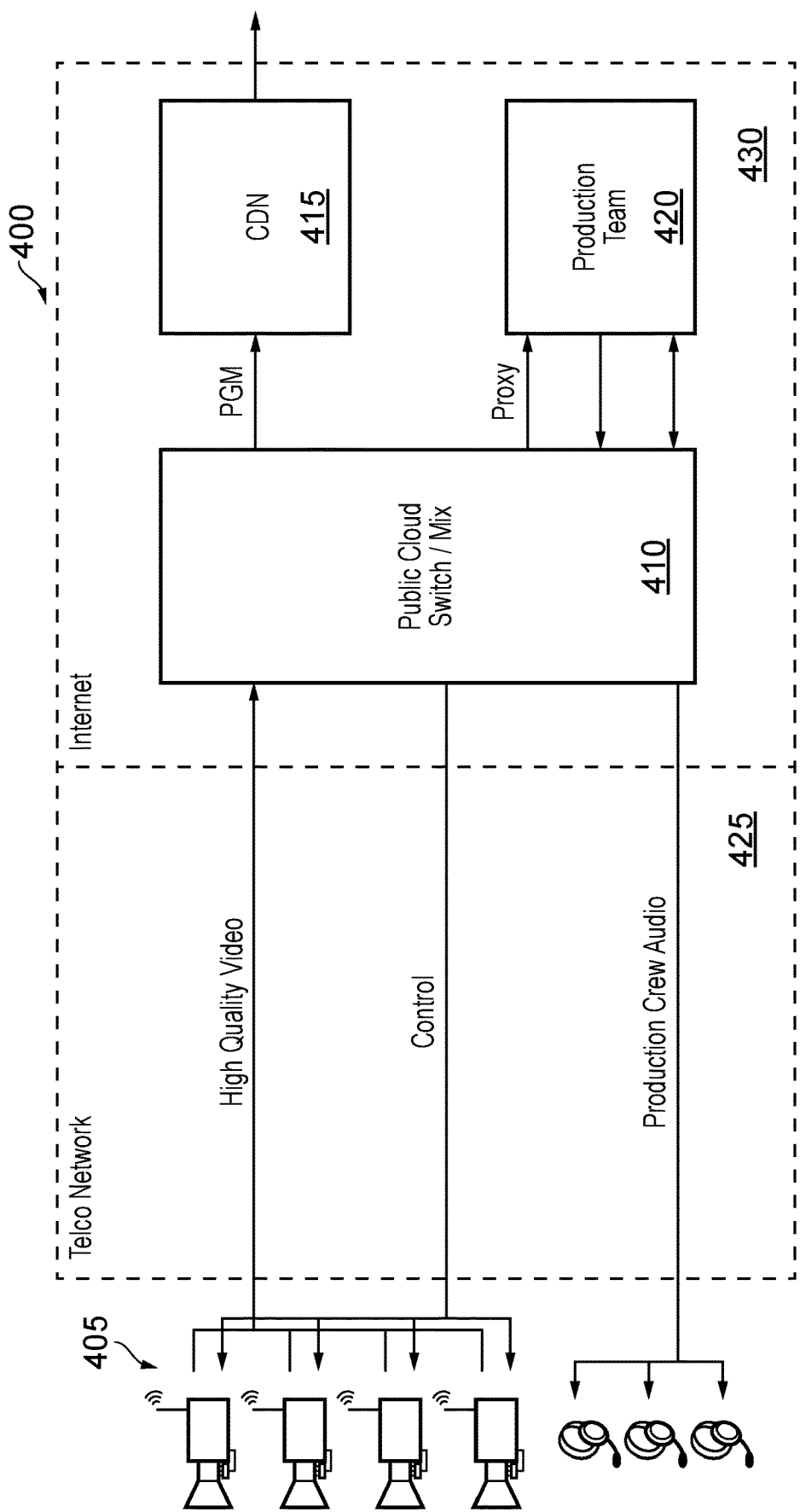
FIG. 4 shows a schematic diagram explaining a virtual production system 400.

FIG. 4 shows a schematic diagram explaining a virtual production system 400 such as the Remote Live Production system from Sony®. In the virtual production network 400 a plurality of cameras 405 capture media content which is to be live edited using the user interface 300. The content may be video content, audio content and/or audio/video content or any other kind of media content. The media content may include High Definition video content such as 1080p content, or Ultra High Definition content such as 4K, 8K or the like. Moreover, the content may be Standard Dynamic Range (SDR) or High Dynamic Range (HDR) content. The media content, in embodiments, is sent over a network 425 which may be a telecommunications network such as a network complying with one of the 3GPP standards or the like. Of course, the disclosure is not so limited and the network may be a wired network (such as an Ethernet network) or a wireless network (such as a WiFi network) or the like. The network 425 has latency and bandwidth characteristics that are the same irrespective of the data sent over the network 425. In other words, the data transferred over the network 425 has the same latency and the same bandwidth constraints irrespective of the type of data sent over the network 425.

As will be explained later, the content is sent to a cloud switch and mixer 410 located on the Internet 430. A cloud switch and mixer 410 allows the output live edited content to be produced from the plurality of input content.

Additionally, control data is sent to the plurality of cameras 405. The control data may be any kind of control data which controls the operation of one or more of the plurality of cameras. As examples, the control data may include, but is in no way limited to, zoom control data that controls the zoom operation of the camera, pan/tilt control data that controls the pan/tilt of the camera or the like. As the control data controls the operation of one or more of the plurality of cameras 405, the control data is time critical data. The control data is sent from the cloud switch and mixer 410 via the network 425. As will be explained later, the control data is generated by a production team who generate the control data using the graphical user interface 300.

Finally, Production Crew Audio is sent to the production crew such as camera operators or sound engineers. The Production Crew Audio is generated by the production team and consists of verbal instructions to the production crew. For example, the production team may instruct a camera operator to change the subject of the content being captured or may instruct a sound engineer to reduce the sensitivity of a boom microphone. Of course, Production Crew Audio may be two-way or multi-way and allows the Crew (such as the camera operator or the sound engineer) to also respond to the Production team or to ask a question of the Production team. Typically, the Production Crew Audio is time critical audio as the production crew will need to change the settings on the camera or piece of equipment quickly or move the camera to point at a different subject. In embodiments, the production Crew Audio is generated by the production team using the Graphical User Interface 300.

Attached to the cloud switch and mixer 410 is a Content Distribution Network 415. The Content Distribution Network (CDN) 415 may be a software platform such as YouTube®, Facebook®, Twitter® or the like onto which the edited content in section 310 of the Graphical User Interface 300 is distributed. Alternatively, the CDN 415 may be a broadcast platform such as a cable television station, terrestrial television station or the like or may even be a mobile platform allowing content to be distributed to one or more cell phones. In fact, the CDN 415 may be any platform over which edited content is distributed. The CDN 415 is located on the Internet 430.

Additionally attached to the cloud switch and mixer 410 is the production team 420. The production team may be one or more person interacting with the graphical user interface 300 located on a user's device such as laptop, tablet or the like and is connected to the cloud switch and mixer 410 over the Internet 430. As noted above, the production team generate the control data and the Production Crew Audio which is sent to the cloud switch and mixer 410.

It should be noted that the respective content feeds from each of the plurality of cameras 405 are sent to the production team as proxy content feeds. In this context, "proxy content feed" means a downscaled version of the content captured by the camera. In other words, the proxy content of a camera output means a representation of the captured content, the representation of the captured content having a smaller size than the captured content. In this instance, smaller size is that the amount of data within the representation is less than that of the captured content and may mean the representation of the captured content has a lower resolution than the captured content, or may be subjected to compression such as I-frame compression or the like. The generation of the proxy content is known and so will not be described in detail for brevity. The proxy content is shown in for each camera feed in section 320 of the Graphical User Interface 300 and is used by the production team to generate the preview section 305 of the Graphical User Interface 300. This provides a downscaled version of the edited content. The high quality captured content is then edited accordingly. The edited high quality content captured by the camera is sent over the CDN 415. In other words, an edited version of the captured content is provided where the editing of the captured content is based on the representation of the captured content.

Therefore, in order to increase the speed at which the edited content is generated, it is important to provide the representation of the captured content (the proxy content feed) quickly. Given that the representation of the captured content is generated at the cloud switch and mixer 410, delay in providing the captured content to the cloud switch and mixer 410 delays the production of the representation of the captured content and therefore, the edited content.

As will be apparent, the captured content, the control data, the Production Crew Audio and the proxy video feed are all provided over the Internet 430. In particular, the captured content, the control data and the Production Crew Audio are provided to the cloud switch and mixer 410 (which is located on the Internet) via a telecommunications network. The proxy video feed is then provided by the cloud switch and mixer 410 to the production team over the Internet.

There are a number of improvements that may be made to the system of FIG. 4. Firstly, as noted above, the control data and the Production Crew Audio data are time critical information that are passed to the plurality of cameras 405 and the production crew respectively. In the system of FIG. 4, there may be some delay in generation of the control data and/or the Production Crew Audio and receipt of the information at the required destination. This is undesirable.

Moreover, the latency in providing the video content to the cloud switch and mixer 410 is high due to a long Group of Pictures (GOP) being used. The Long-GOP is used to reduce the data rate across the telecommunications network.

Figure 5:
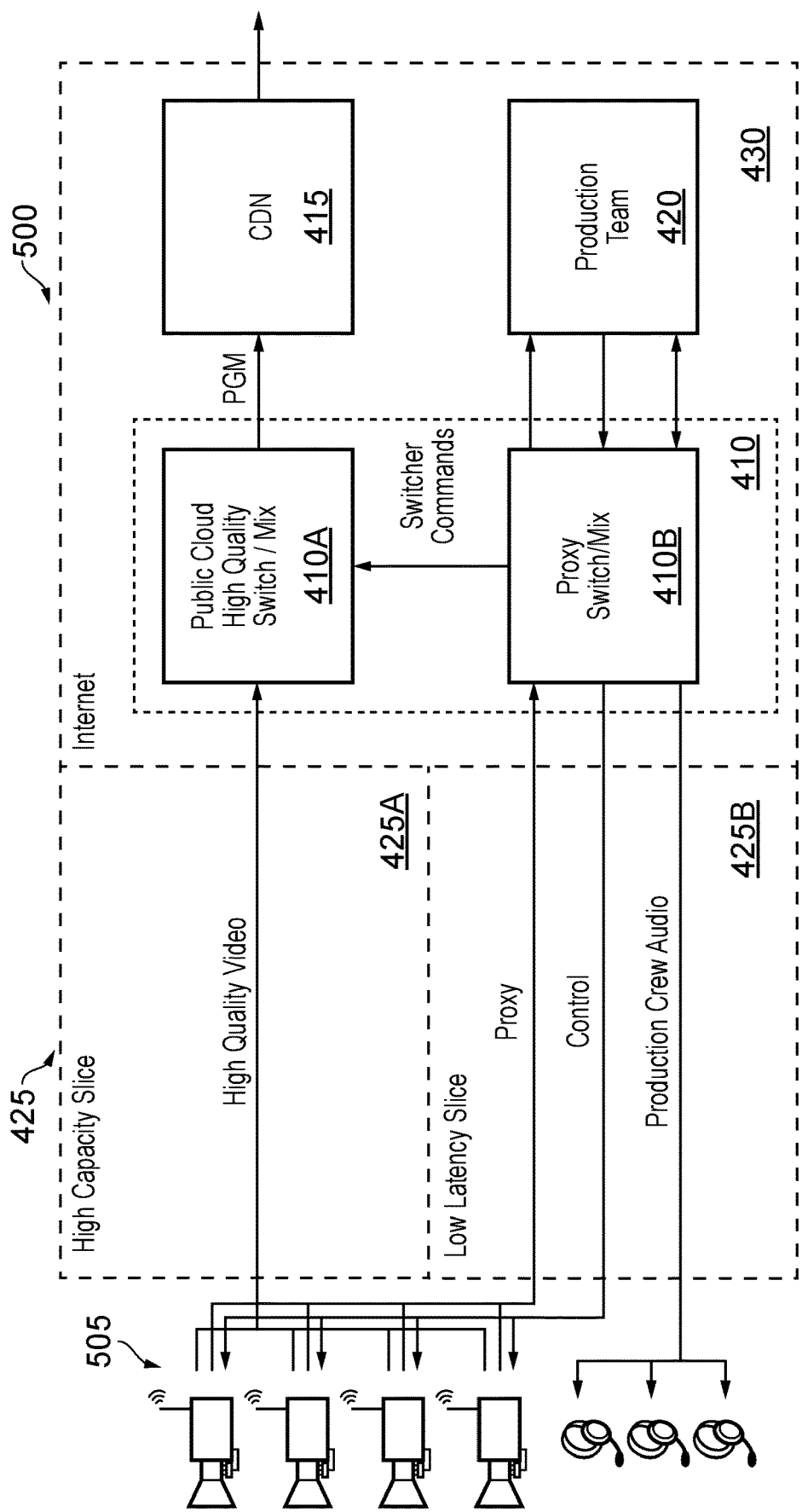
FIG. 5 shows a system according to one embodiment of the disclosure.

FIG. 5 shows a system according to one embodiment of the disclosure. The system 500 of FIG. 5 contains features that are also present in FIG. 4. For the sake of convenience, like features will have the same reference numerals and will not be described for brevity.

The system of FIG. 5 shows a content distribution network 415 and production team 420 both located on the Internet. The functionality of each of these features is the same as described with reference to FIG. 4 and so will not be described hereinafter.

However, in embodiments of the disclosure, there is provided a first and second network path across the network. Importantly, the first network path and the second network path have different levels of latency. Specifically, the first network path has a higher latency than the second network path. In embodiments of the disclosure, and as will be explained, the routing of various data across these two network paths aims to improve the system of FIG. 4.

According to embodiments of the disclosure, the smaller size representation of the captured content (the proxy feed) is generated within each of the plurality of cameras 505 at the same time of capturing the content. The captured content is then sent over the first network path to the cloud switch and mixer 410. Specifically, the captured content is then sent over the first network path to a first part of the cloud switch and mixer 410A and the proxy feed is sent over the second network path to a second part of the cloud switch and mixer 410B.

The representation of the captured content is then edited by the production team to generate an output of the media content. In other words, the editing by the production team is performed on the representation of the captured content received over the second network path. The edit decision list (or other instructions defining the editing steps of the media content) is sent from the second part of the cloud switch and mixer 410B to the first part of the cloud switch mixer 410A. These instructions will be used by the first part of the cloud switch mixer 410A to edit the captured content. In other words, the editing steps performed on the representations of the captured content are then performed on the captured content itself in the first part of the cloud switch mixer 410A.

In embodiments, the cloud switch and mixer 410 includes the first part 410A and the second part 410B; the first part 410A being configured to handle the content captured by the plurality of cameras 505 and the second part 410B being configured to handle the Production Crew Audio, control data and the proxy feed.

Of course, the disclosure is not limited. For example, the cloud switch and mixer 410 of FIG. 4 may be used in embodiments without requiring the particular configuration explained with reference to FIG. 5. Moreover, the disclosure is not limited to one or more of the cameras 505 producing the proxy feed. In fact, the proxy feed may be produced by any device. However, it is important that the smaller size representation of the content is sent over the lower latency (second) network path.

In the embodiment of FIG. 5, the control data and the Production Crew Audio are also sent over the second network path. In embodiments, the control data and the Production Crew Audio are sent from the second part of the cloud switch and mixer 410B to the cameras and the production crew respectively. The control data and the Production Crew Audio are, in embodiments, optionally sent over the second network path. It should be noted that the disclosure is not so limited. In particular, either one or neither one of the control data and the Production Crew Audio may be sent over the second network path. Of course, either or both of the control data and the Production Crew Audio may be sent over a third or fourth network path in other embodiments.

In embodiments, the content captured by the plurality of cameras 505 is sent over the first network path 425A. The first network path 425A has a higher latency than the second network path 425B. In embodiments, the first network path 425A has a higher bandwidth than the second network path 425B. This allows the captured content to be sent to the first part of the cloud switch and mixer 410A.

As the representation of the captured content (the proxy content feed) will arrive at the cloud switch and mixer 410 before the content captured by the plurality of cameras 505, the production team 420 may start editing the representation of the content more quickly than is the case with the system 400 of FIG. 4. This is because the proxy content is sent over the second network path 425B which has a lower latency than the first network path 425A. As the representation of the captured content is used to edit the captured content, and because the representation of the captured content is sent over the lower latency network path and so will arrive at the cloud switch and mixer 410 before the captured content, the production team 420 may begin editing the content. Accordingly, when the captured content arrives at the cloud switch and mixer 410 the edited content may be generated. As the edited content is generated based on the representation of the captured content, the edited content in the system of FIG. 5 is provided more quickly than the system of FIG. 4.

As the proxy content feed is sent over the second network path 425B which allows the editing to occur more quickly, the captured content may be compressed using Long-GOP compression.

As the representation of the captured content is provided separately to the captured content, an association is provided within either the representation of the captured content or within the captured content itself. The association allows the representation of the captured content to be linked to the captured content so that editing decisions based on the representation can be applied to the captured content itself. The association may take many forms. For example, a unique identifier may be provided to both the representation of the captured content and the corresponding captured content. This unique identifier may be any kind of metadata such as a time stamp (or timing information more generally) or a Unique Material Identifier (UMID) or any form of mechanism that allows such association.

Although the above discusses providing an association within either the representation of the captured content or within the captured content itself, the disclosure is not limited. For example, an image matching algorithm may be applied to the representation and to the captured content and the association may be made on the basis of the image matching algorithm. Such an image matching algorithm is known to the skilled person and so will not be described any further here for brevity.

The editing commands and the frames of the captured video are sent from the second part of the cloud switch and mixer 410B to the first part of the cloud switch and mixer 410A as switcher commands The switcher commands are commands that enable the captured content to be edited within the first part of the cloud switch and mixer 410A based on the representation of the content.

In embodiments of the disclosure, the first part of the network 425A and the second part of the network 425B may be different network slices within the same network infrastructure. As would be appreciated by the skilled person, a network slice is a form of virtual network architecture using the same principles behind Software Defined Networking (SDN) and Network Functions Virtualisation (NFV) in fixed networks. Of course, any kind of network slicing is envisaged such as end-to-end network slicing which extends to, but is not limited to, the air interface, backhaul and the like as would be appreciated. Network slicing allows multiple virtual networks to be created on top of a common shared physical infrastructure. Each of the virtual networks are isolated and have different characteristics in terms of bandwidth, latency, error rate and even availability.

Of course, the disclosure is not so limited. For example, the first part of the network 425A and second part of the network 425B may be different networks. The first part of the network 425A may therefore be a wireless network and the second part of the network 425B may be a wired network.

According to embodiments, the system of FIG. 5 can be further improved. Specifically, in the system 500 of FIG. 5, the control data, proxy content feed and Production Crew Audio (which are all time critical data) are still provided, at least in part, over the Internet. This leads to an increase in jitter and latency.

Figure 6:
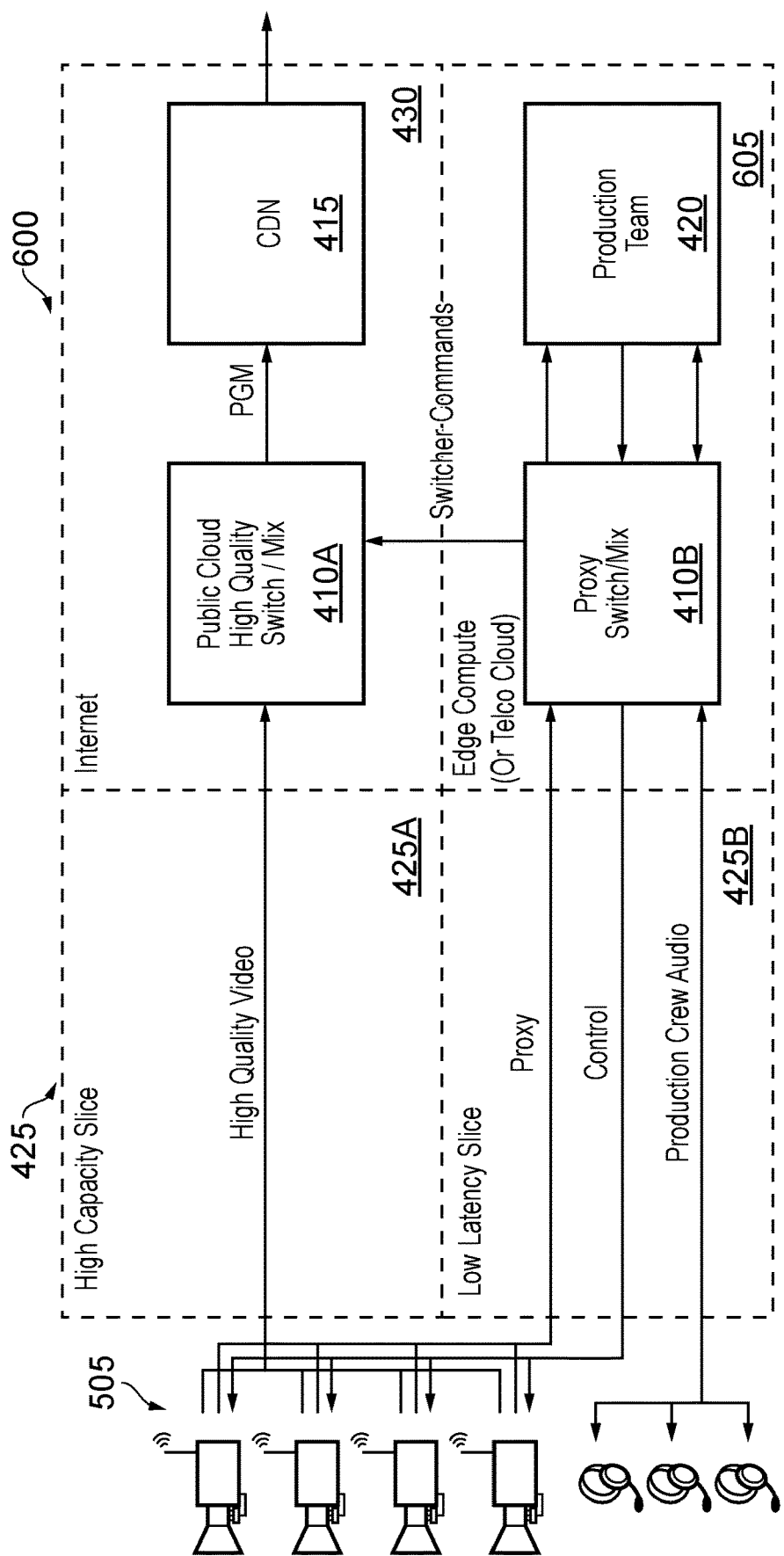
FIG. 6 shows a system according to another embodiment of the disclosure.

In order to try and address this, the system of FIG. 6 is, in embodiments, provided. As will be appreciated, many of the features of FIG. 5 are present in FIG. 6. These features have like reference numerals and will not be described for brevity.

The difference between the system 500 of FIG. 5 and the system 600 of FIG. 6 is the provision of the second part of the cloud switch and mixer 410B and the production team 420 on edge computing. As is known, edge computing is typically the practice of processing data on devices near the edge of a network, where the data is being received over the second network path 425B. In other words, the data received over the second network path 425B does not pass through many routers and firewalls prior to being provided to the second part of the cloud switch and mixer 410B and the production team 420. This reduces the latency in processing the time critical data.

Although the foregoing describes placing the second part of the cloud switch and mixer 410B and the production team 420 on edge computing, the disclosure is not so limited. For example, the first part of the cloud switch and mixer 410A may be located on edge computing.

Figure 7:
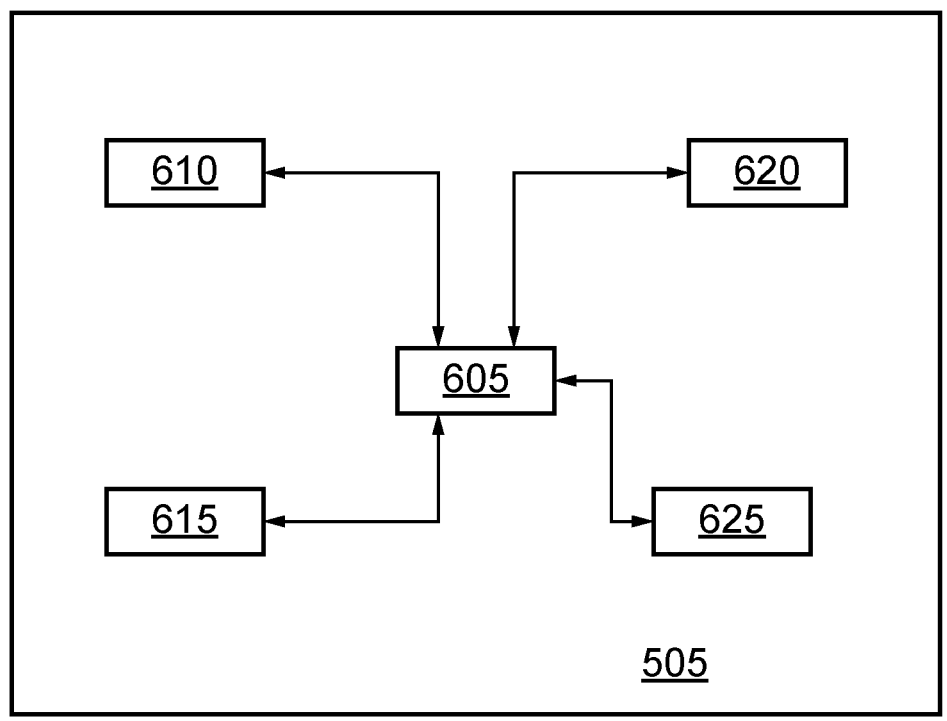
FIG. 7 shows a virtual reality headset according to embodiments of the disclosure.

FIG. 7 shows a representation of camera 505 according to embodiments of the disclosure. As noted above, each of the cameras 505 produce the representation of the captured content at the same time as capturing the content; the representation of the captured content being sent over the second network path 425B. The camera 505 is very similar to the camera 100 shown in FIG. 1.

The camera 505 comprises a camera processor 605. The camera processor may consist of circuitry that is arranged to run computer software in order to control the operation of the camera 505. For example, the camera processor 605 may be a microprocessor or an Application Specific Integrated Circuit (ASIC) or any kind of appropriate circuitry.

The camera processor 605 is connected to camera storage 610. The camera storage may be integrated with the camera 505 or may be an external memory card that is inserted into the camera 505 during operation or any combination thereof. It is envisaged that the camera storage 610 will store the computer program and computer instructions which will be used by the camera processor 605 to control the operation of the camera 505. In embodiments, the camera storage 610 may be permanent or semi-permanent (deletable) and may be in a configuration where part of the camera storage 610 is a store which may be a temporary store such as a buffer or a more permanent store and part is used for recording the captured content more permanently. The camera storage 610 will, in embodiments, act as a buffer storing at least temporarily, content as will be explained later.

Additionally connected to the camera processor 605 is camera communication circuitry 620. The camera communication circuitry 620 communicates with server 200 (as explained in FIG. 2) over the network described above.

Additionally connected to the camera processor 605 is camera control circuitry 615. The camera control circuitry 615 receives control instructions over the network via the camera communication circuitry 620 and controls the operation of the camera 100 in accordance with the received control information as described with reference to FIG. 1. For example, the control information may include signalling to control the pitch, pan and zoom of the lens arrangement using which the camera 505 captures the images. Instead of, or in addition, the camera control circuitry 615 may receive audio data from the server 200 of the producer instructing a camera operator to perform various functions. For example, the producer may instruct the camera operator to capture a different part of the scene or alter the zoom settings on the camera 505 manually.

In embodiments of the disclosure, the captured content is optionally compressed and stored in the storage 610. The storage, in this embodiment, is configured as a buffer and sends the captured content over the first network part 425A upon receipt at the camera of a release command from the second part of the cloud switch and mixer 410B. This release command is included in the control data sent over the second network path 425B and is smaller in size than the captured content. The release command includes an identifier for the captured content to be released. The identifier may be a Unique Material Identifier or time code that uniquely identifies the captured content from other content.

Specifically, the release command is sent from the second part of the cloud switch and mixer 410B when the production team 420 determine that the captured content is required in the first part of the cloud switch and mixer 410A to generate the edited captured content. In other words, as described above, the production team 420 determine the edited content using the proxy feed sent over the lower latency second network part 425B, and when the corresponding captured content is required in order to produce the edited captured content, the release command is issued to the camera instructing the storage 610 within the camera 505 to transfer the captured content over the first network path 425A to the first part of the cloud switch and mixer 410A. The captured content that has been transferred is provided to the first part of the cloud switch and mixer 410A to produce the edited content.

In some embodiments, the release command may be sent to two or more cameras at substantially the same time. This will occur, for example, if the captured content from two or more cameras is required to be edited together. In this instance, a camera identifier may be included in the release command to identify the camera for which the release command is destined. This camera identifier may be set up manually during setup of the camera or maybe the MAC address of the camera or the like. Of course, the release command may be sent to each camera directly and in which case, no camera identifier is required.

In the event that a release command for the captured content is not provided within a predetermined period, then that captured content is deleted. This reduces the storage requirements for the captured content. Moreover, in embodiments, content captured earlier than the captured content for which a release command has been received may be deleted. This is because this earlier captured content will not be used in the edited content and will reduce the storage required for the captured content. Of course, the disclosure is not so limited and the captured content may be stored locally for later use or may be transferred to the first part of the cloud switch and mixer 410A using the first network path 425A at a later time when, for example, the first network path 410A has low usage.

By providing the captured content in response to the release command, the amount of data transferred across the first network path 425A is less. Moreover, as the release command is smaller in size than the captured content, the amount of data transferred across the network 425 as a whole is reduced.

In particular, in the example of FIG. 4, if we assume that each of the six cameras 505 are 4K cameras, each camera will produce around 22GB of media content per hour. Therefore, if each of the six cameras transfer this data across the first network part 425A to the first cloud switch and mixer 410A, then there will be around 132GB of media content transferred an hour across the first network part 425A.

However, in the event that only media content from two of the cameras is required, the amount of media content transferred across the first network part 425A will be around 44GB an hour. Clearly this is a significant saving in network resources.

Use of Network Slices in Virtual Reality

Figure 8:
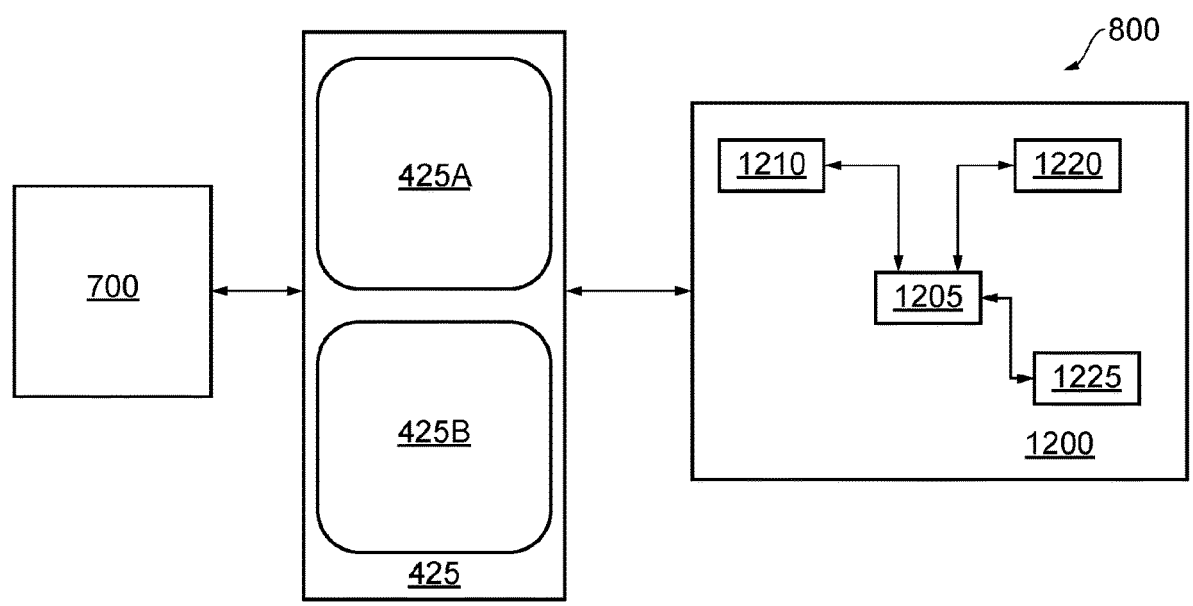
FIG. 8 shows a system according to one embodiment of the disclosure.

FIG. 8 shows a system 800 in which a Virtual Reality headset 700 is connected to the server 1200 across a network 425.

The server 1200 comprises a server processor 1205. The server processor 1205 is circuitry that controls the operation of the server 1200. The server processor 1205 may therefore be an Application Specific Integrated Circuit or microprocessor that runs computer readable instructions in order to perform the embodiments of the disclosure.

Additionally connected to the server processor 1205 is server storage 1210. The server storage 1210 may be embodied as solid state storage or magnetically readable storage and contains the software instructions that are used to control the server processor 1205. In addition, the server storage 1210 may also include a virtual reality environment as will be explained later with reference to FIGS. 9A-9C. Server communication circuitry 1220 is connected to the server processor 1205 and is circuitry that communicates with the virtual reality headset 700 over the network 425. The network 425, as explained with reference to FIG. 1, may be a telecommunications network complying with the LTE standard or any 3GPP Standard.

Additionally connected to the server processor 1205 is server control circuitry 1215. The server control circuitry 1215 receives an input from a user. The user may provide an input using a Graphical User Interface.

The network 425 has a first network part 425A and a second network part 425B as described above with reference to FIG. 5. The first network part 425A and the second network part 425B of FIG. 8 have similar characteristics to those of FIG. 5. Specifically, the first network part 425A has a higher latency than the second network part 425B and the first network part 425A has, in embodiments, a higher bandwidth than the second network part 425B. It should be noted that in order to ensure a low latency network, the use of the second network part 425B should be carried out sparingly. In other words, typically resources on a lower latency network are more expensive than those on a higher latency network.

Figure 9A:
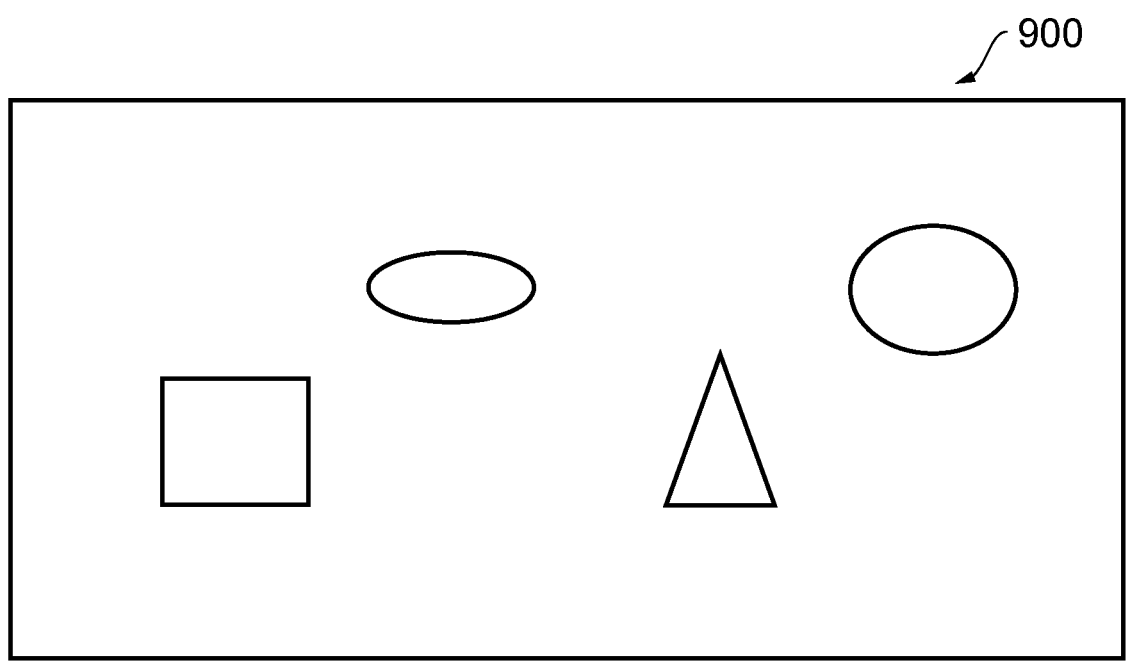
FIGS. 9A-9B shows views within a virtual reality environment.
Figure 9B:
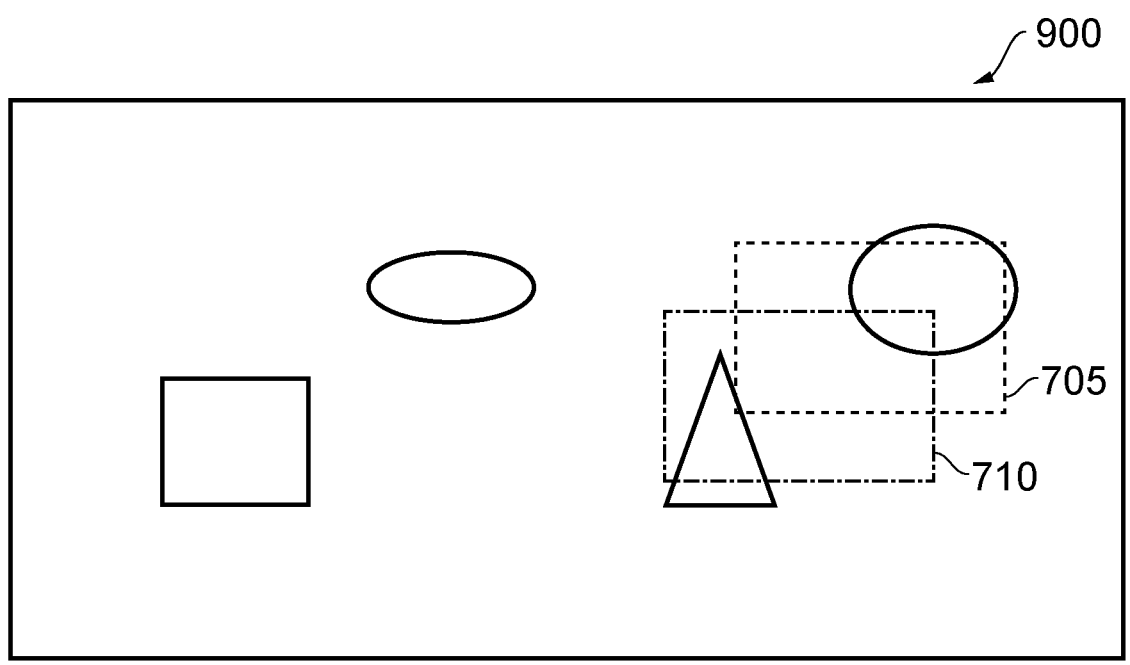
Figure 9C:
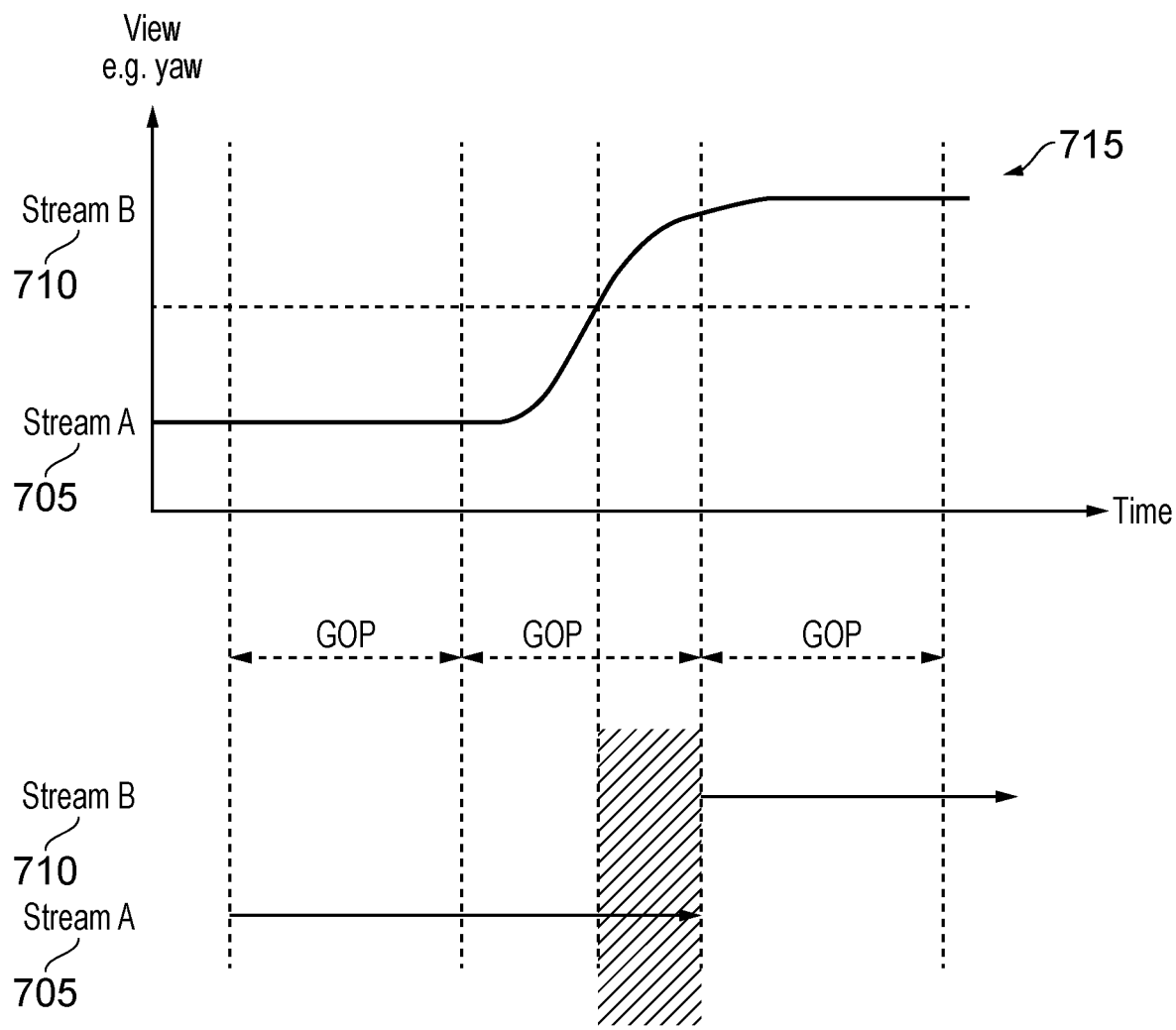
FIG. 9C shows a timing diagram for the change in view within FIG. 9B.

FIGS. 9A to 9C explain a problem which is addressed by embodiments of the disclosure. In FIG. 9A an image 900 is shown which may be used in a virtual reality environment. Specifically, the image 900 shows a number of shapes located within a virtual reality environment around which a user may move. In FIG. 9B the user is shown moving from the current (first) view 705 to a new (second) view 710. In other words, the user moves his or her head and so the view shown to the user on a Virtual Reality headset is changed from the current view 705 to the new view 710. The head position of the user and so the view displayed to the user wearing the virtual reality headset 700 is determined using sensors within the virtual reality headset 700 such as accelerometers and gyroscopes as is known.

Referring to FIG. 9C, this movement is shown in the graph 715. Specifically, at the current yaw value, the user is shown view 705. This view is comprised of one or more Group of Pictures. In other words, the current view may be a moving image. However, as the user moves their head and so the view moves from current view 705 to new view 710, a second Group of Picture stream is required to be decoded by the Virtual Reality headset 700. In particular, as is apparent from graph 715, the user moves their head during the decoding of the GOP stream for the current view 705. This means that the decoding of the second GOP is required before the content of the new view can be displayed. Accordingly, there is missing content which will not be decoded as the user moves their head from the current view 705 to the new view 710. This is identified in FIG. 9C as a hashed region.

Currently, there are techniques which are used to address this problem. Firstly, when the user moves from the current view to the new view, the current view is paused to show a stationary image whilst the second GOP is decoded. This provides a mechanism to avoid showing a blank screen to the user, but in fast moving scenarios such as computer games and the like, this is undesirable.

Another technique is that in addition to the current view 705 (which is a high resolution stream), a low resolution stream of the entire image 900 is sent to the headset. This allows a low resolution stream to be shown as the new view whilst the high resolution GOP is decoded. This provides a mechanism to show a moving image in the new view but consumes large amounts of bandwidth and requires additional processing within a Virtual Reality headset 700 as the whole image is sent.

Embodiments of the present disclosure aim to provide a mechanism that allows a moving image to be provided to the Virtual Reality Headset as the user's view changes from the current view 705 to the new view 710. This is achieved using the network having the first network part 425A and the second network part 425B.

Figure 10:
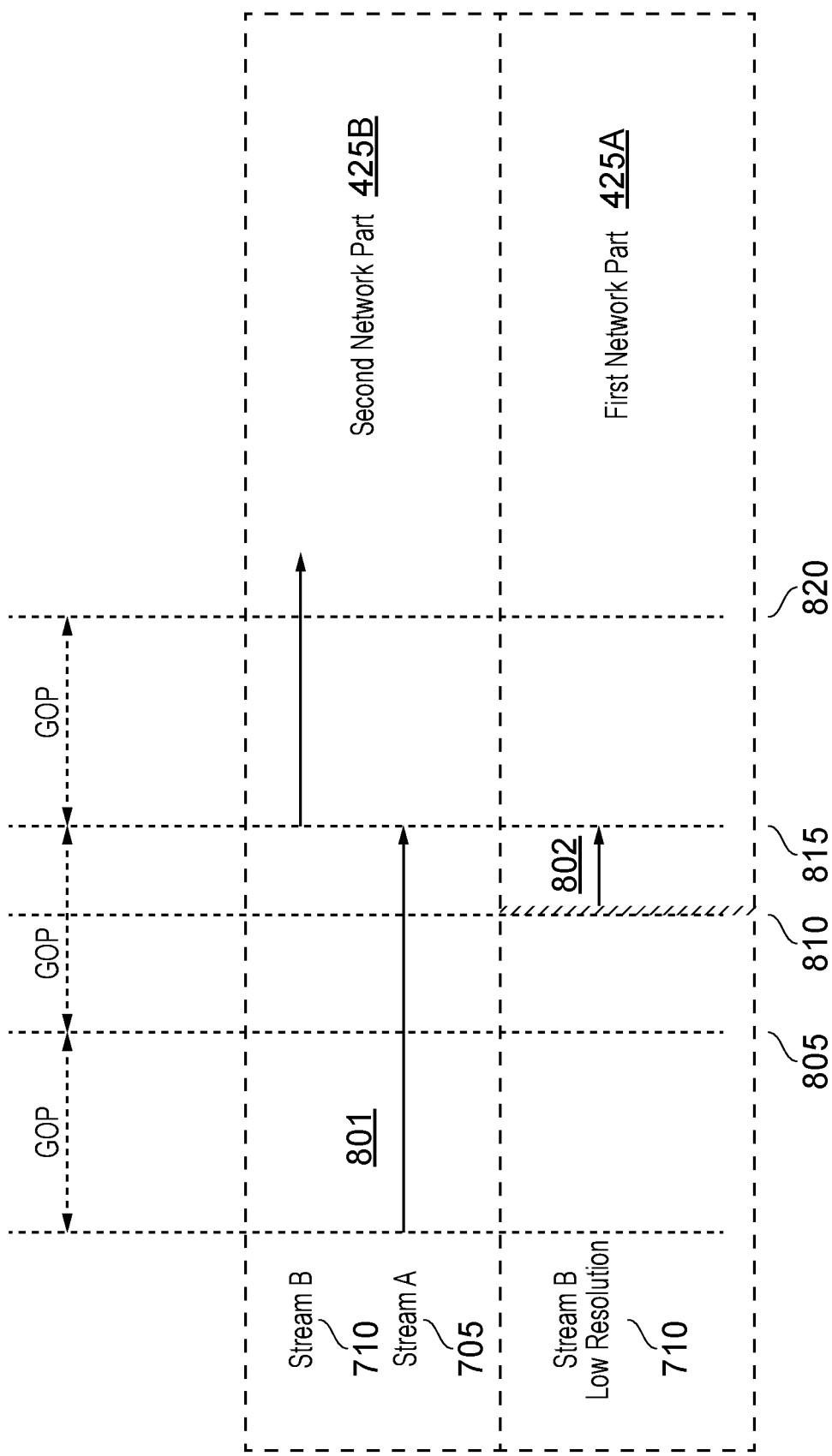
FIG. 10 shows a timing diagram according to embodiments of the disclosure.

Referring to FIG. 10, embodiments of the disclosure aimed at addressing the problems described with reference to FIGS. 9A-9C is shown.

As is evident from FIG. 10, the stream for current view 705 is sent during time 801. During transmission of the second GOP (starting at time 805), the user moves their head to new view 710. The transition from the current view to the new view occurs at time 810. In the explanation of FIG. 9C, a stationary image of the current view may be shown during the transition whilst the second GOP associated with the new view is shown. However, in the case of the embodiments of FIG. 10, a low resolution version of the new view is sent via the second network part 425B (the lower latency part). This low resolution version is a low resolution moving image of the new view. This content is sent during the period 802.

As the low resolution moving image of the new view is sent via the second network part 425B, there is a reduced latency on providing the missing content to the Virtual Reality headset 700. This means that a smaller amount of content is missing from the decoded new view as the user moves their head and so ensures that the user does not perceive any of the content as missing whilst the user's view changes. In other words, the view displayed to the user as the user moves their head is a low resolution version moving image of the new view which the user is unlikely to notice is of a lower resolution as they are moving their head at the same time as the lower resolution version is provided. This improves the user experience and addresses the problem noted in FIGS. 9A-9C.

At time period 815 the full resolution version of the moving image of the new view (stream B) is provided over the first network part 425A (the higher latency part of the network). This is because the requirement to provide stream B immediately is reduced as the user will be viewing the lower resolution version of stream B. By sending the full resolution version of the new view over the first network part 425A, the use of the lower latency part of the network is reduced. This improves the overall use of the resources of the network 425. In embodiments, the first network part 425A is a higher bandwidth than the second network part 425B. This allows stream B to be provided to the viewer in a timely manner which ensures the new view will be provided in full resolution quickly.

Figure 11:
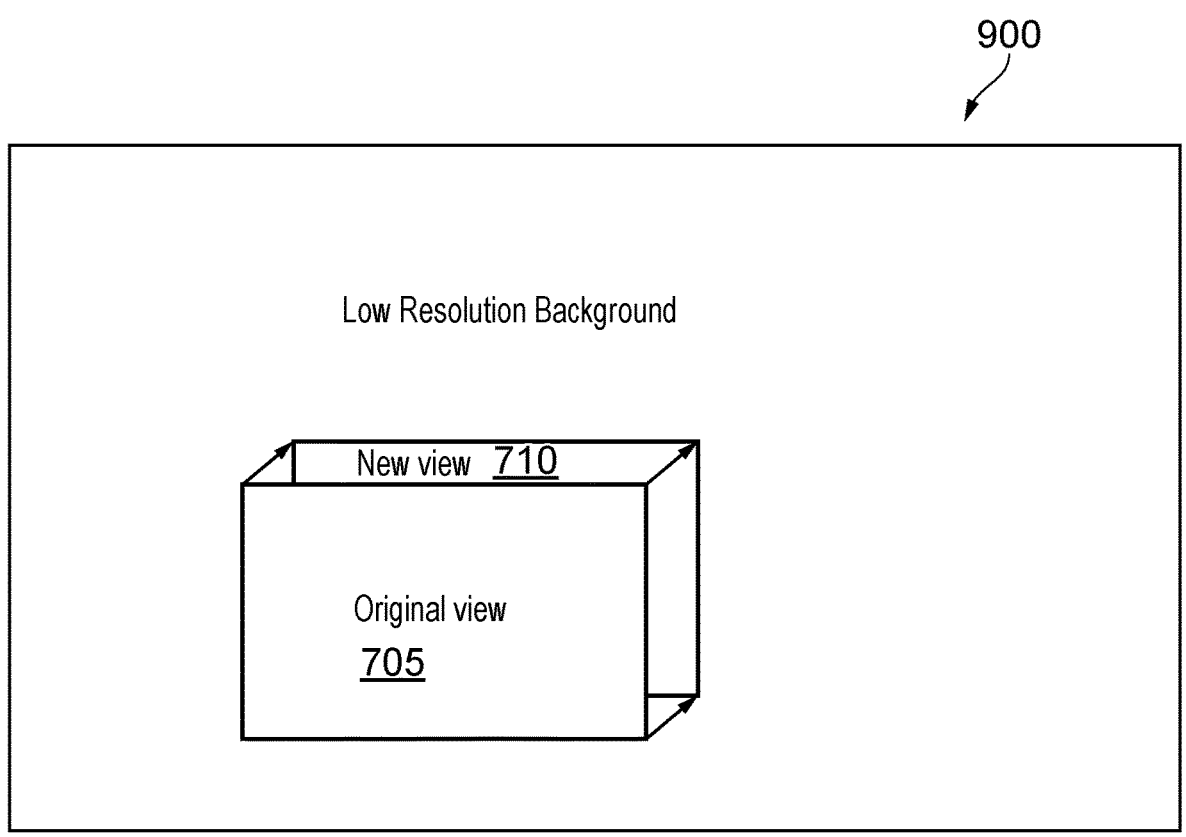
FIGS. 11-13 shows various views within the virtual reality environment.

FIG. 11 shows a further improvement on the embodiment of FIG. 10. In the embodiment of FIG. 11, the original view 705 has an amount of overlap with the new view 710. In embodiments, to reduce the amount of data that is sent via the lower latency, second network part 425B, the overlapping region of the new view is not transmitted across the second network part 425B. In other words, only the non-overlapping region of the new view will be transmitted over the second network part 425B. This reduces the amount of data to be sent over the second network part 425B.

Of course, the disclosure is not so limited. In other embodiments, the overlapping region of the new view may be stored locally within the virtual reality headset 700 and, in this instance, the overlapping region need not be transmitted across the network at all.

It is further possible to transmit the non-overlapping region of the new view in full resolution. In other words, a smaller number of pixels will be transmitted over the second network part 425B. This means that the user will notice no reduction in quality of the new view as the user moves from the original view to the new view whilst reducing the amount of resources used in the second network part 425B. So, in embodiments, a full resolution version of the non-overlapping region of the new view is sent over the second network part 425B. Accordingly, the full resolution version of the overlapping region of the new view may be used, in conjunction with the full-resolution version of the non-overlapping region sent over the second network part 425B, to reconstruct the new view in full resolution.

In order to reconstruct the new view, the virtual reality headset 700 would decode the non-overlapping region of the new view. The decoded non-overlapping region of the new view would be displayed with the overlapping region of the new view which is stored locally within the virtual reality headset 700 (as the overlapping region was previously displayed by the virtual reality headset 700). This constructs the new view. It is envisaged that the construction would be performed using the baseband (uncompressed) images.

In addition, a low resolution version of the entire image 900 may be sent over the network. This is optional. The low resolution version of the entire image 900 is used in case the viewer moves their head very quickly and the number of pixels in the non-overlapping region is above a threshold number. In other words, the number of pixels that need to be sent over the second network part 425B in one video frame period is above the threshold number. In this case, the low resolution version of the entire image 900 may be used to fill in the non-overlapping region that cannot be sent over the second network part 425B. In other words, the non-overlapping region is extracted from the low resolution version of the entire image 900 and is combined with the overlapping region (which was previously displayed in part on the virtual reality headset) and displayed to the user. Indeed, the disclosure is not so limited and the low resolution version of the entire image corresponding to the non-overlapping region may be shown, in conjunction with the overlapping region to the user. This means that the user will only have the non-overlapping region shown in low resolution and so will improve the user experience.

Figure 12:
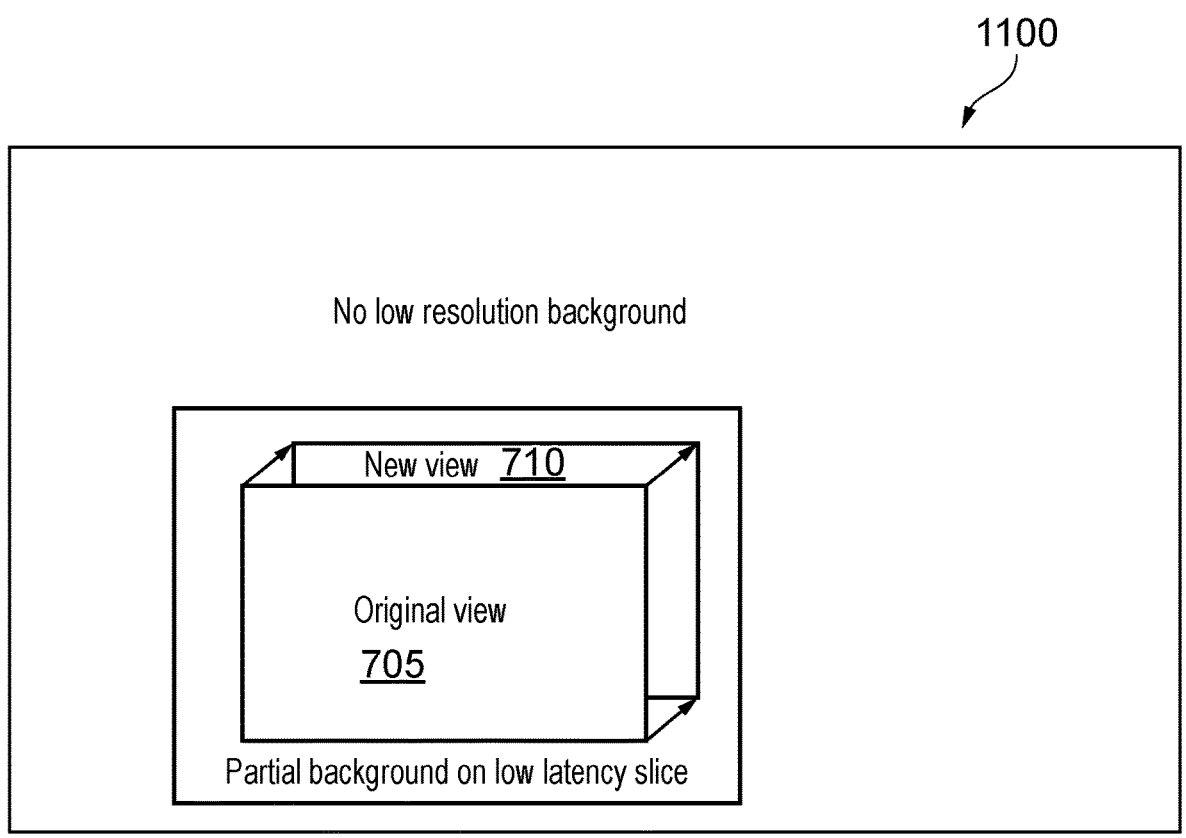

FIG. 12 shows a different embodiment to that of FIG. 11. In the embodiment of FIG. 12 a partial background 1105 is sent over the second network part 425B. This partial background 1105 is smaller than the entire view 1100. The partial background may be, for example, smaller in size than the entire view 1100 or may be of a lower resolution than the entire view 1100. In particular, the partial background 1105 is slightly larger than the boundary of the original view 705 and the new view 710. Specifically, the size of the boundary of the partial background 1105 may be defined by the amount the maximum amount of movement the user will be able to make over a single frame period. In other words, the maximum amount of movement the user can achieve in one frame period. This partial background 1105 is, in embodiments, at high resolution. However, the disclosure is not so limited. This means that the full background is not needed to be sent to the headset 700. Moreover, by sending a partial background 1105, the demand for data to be sent over the second network path 425B is constant.

The size of the partial background may be dependent upon one or more factors. For example, the size of the partial background may be associated with the historic head movement of the user of the virtual reality headset 700 or the entire view being displayed. For example, in the event that the entire view is a fast moving computer game, where the user typically moves their head quickly, then the size of the boundary may be larger than if the user typically moves their head slowly whilst watching other content. In addition, where the size of the partial background is smaller, the resolution of the partial background may be increased, for example, proportionately. In other words, the resolution of partial background may change in dependence on the size of the partial background.

Further, the size of the partial background may depend on the content of the entire view. For example, the content of the entire view may be a tennis tournament, where the head position is predicted by the movement of the ball and is typically limited to close to the boundaries of the tennis court. Another example is if the content of the entire view is a concert, where the head position of the user is predicted by the stage and is typically limited to close to the boundaries of the tennis court. In either of these examples, the size of the partial background may be smaller and the resolution of the partial background may be correspondingly increased compared with a soccer match or the like where the movement of the head to follow the ball is less predictable.

Figure 13:
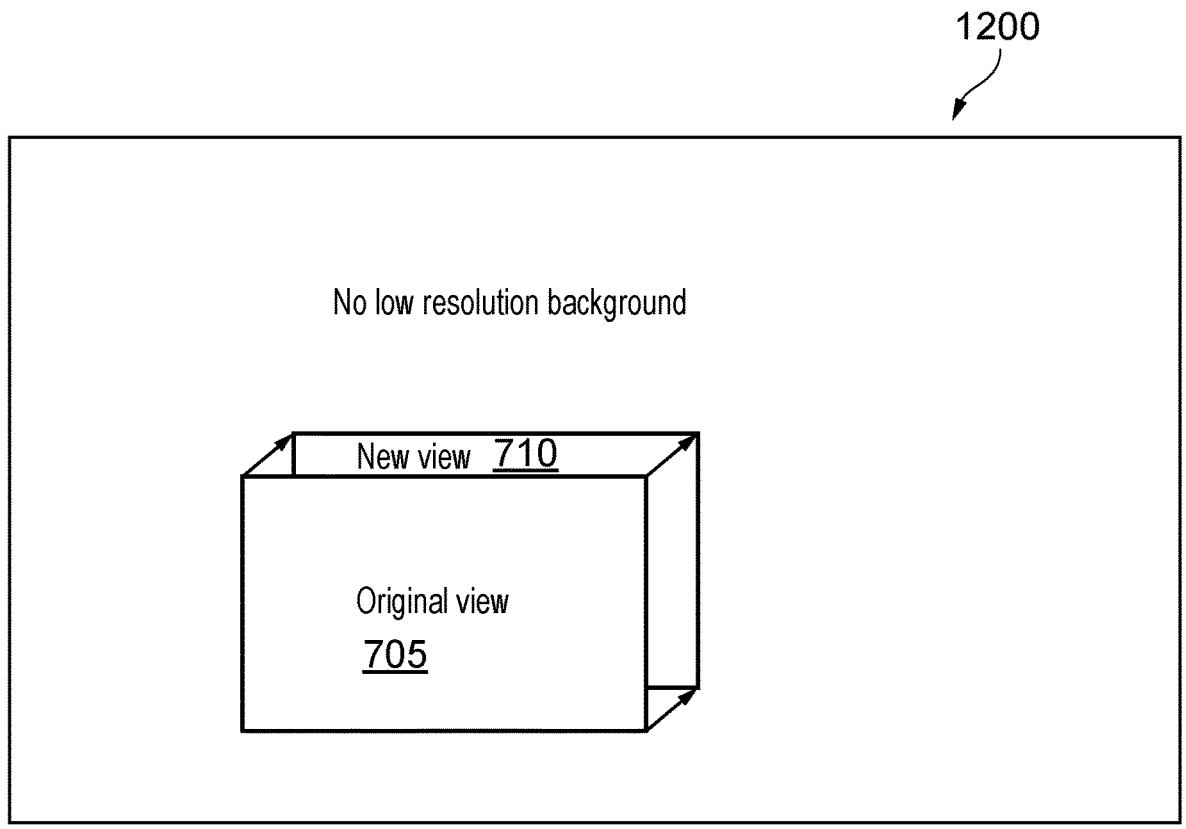

FIG. 13 shows a variation 1200 on the embodiment of FIG. 11. Specifically, in the embodiment of FIG. 13, the new view 710 is of lower quality and no entire image is sent. The new view 710 is sent over the second network part 425B. This, as noted above, ensures that the user will see a moving image and so would improve the overall experience of the user.

Although the disclosures of FIGS. 7 to 13 describe the current view and the new view being encoded as a Group of Pictures (GOP) the disclosure is not so limited. For example, any image compression technique may be used such as Intra Frame encoding may be used instead. This allows the new view to be quickly decoded and the decoding of one frame does not depend on the decoding of a previous frame.

Additionally, the views sent over the low latency network part can be sent and decoded faster than real-time. This ensures that the time taken to fill in the missing content is less than one frame period and so the viewer does not miss any content.

Obviously, numerous modifications and variations of the present disclosure are possible in light of the above teachings. It is therefore to be understood that within the scope of the appended claims, the disclosure may be practiced otherwise than as specifically described herein.

In so far as embodiments of the disclosure have been described as being implemented, at least in part, by software-controlled data processing apparatus, it will be appreciated that a non-transitory machine-readable medium carrying such software, such as an optical disk, a magnetic disk, semiconductor memory or the like, is also considered to represent an embodiment of the present disclosure.

It will be appreciated that the above description for clarity has described embodiments with reference to different functional units, circuitry and/or processors. However, it will be apparent that any suitable distribution of functionality between different functional units, circuitry and/or processors may be used without detracting from the embodiments.

Described embodiments may be implemented in any suitable form including hardware, software, firmware or any combination of these. Described embodiments may optionally be implemented at least partly as computer software running on one or more data processors and/or digital signal processors. The elements and components of any embodiment may be physically, functionally and logically implemented in any suitable way. Indeed the functionality may be implemented in a single unit, in a plurality of units or as part of other functional units. As such, the disclosed embodiments may be implemented in a single unit or may be physically and functionally distributed between different units, circuitry and/or processors.

Although the present disclosure has been described in connection with some embodiments, it is not intended to be limited to the specific form set forth herein. Additionally, although a feature may appear to be described in connection with particular embodiments, one skilled in the art would recognize that various features of the described embodiments may be combined in any manner suitable to implement the technique.

Embodiments of the disclosure may be generally described with reference to the following paragraphs:

1. A method of providing edited media content comprising:
   generating captured content and a representation of the captured content, the representation of the captured content having a smaller size than the captured content;
   providing the captured content over a first network path across a network and the representation of the captured content over a second network path across the network, the first network path having a higher latency than the second network path;
   generating an edited version of the received representation of the captured content; and
   providing an edited version of the captured content, the editing of the captured content being based on the editing of the representation of the captured content.

2. A method according to clause 1, wherein the content is captured using a camera, and the method comprising:
   communicating at least one of audio for an operator of the camera and control information for the camera over the second network path.

3. A method according to clause 1, comprising:
   providing metadata with both the captured content and the representation of the captured content, the metadata being used to associate the captured content with the corresponding representation of the captured content.

4. A method according to clause 1, wherein the first network path has a higher bandwidth than the second network path.

5. A method according to clause 1, wherein the content is captured using a camera, and the method comprises:
   storing the captured content before providing the captured content over the first network path;
   providing the representation of the captured content over the second network path;
   receiving a release signal over the second network path; and
   in response to the release signal, providing the captured content over the first network path.

6. A method according to clause 1, comprising:
   creating editing instructions when generating the edited version of the received representation of the content; and
   editing the captured content on the basis of the created editing instructions.

7. A method according to clause 6, wherein the creating editing instructions is performed on edge computing.

8. A method according to clause 1 wherein either one or both of the first and second network paths are across a telecommunications network.

9. A computer program product comprising computer readable instructions which, when loaded onto a computer, configure a compute to perform a method according to clause 1.

10. An apparatus for providing edited media content, the apparatus comprising circuitry configured to:
    generate captured content and a representation of the captured content, the representation of the captured content having a smaller size than the captured content;
    provide the captured content over a first network path across a network and the representation of the captured content over a second network path across the network, the first network path having a higher latency than the second network path;
    generate an edited version of the received representation of the captured content; and
    provide an edited version of the captured content, the editing of the captured content being based on the editing of the representation of the captured content.

11. An apparatus according to clause 10, wherein the content is captured using a camera, and the circuitry is configured to:
    communicate at least one of audio for an operator of the camera and control information for the camera over the second network path.

12. An apparatus according to clause 10, wherein the circuitry is configured to:
    provide metadata with both the captured content and the representation of the captured content, the metadata being used to associate the captured content with the corresponding representation of the captured content.

13. An apparatus according to clause 10, wherein the first network path has a higher bandwidth than the second network path.

14. An apparatus according to clause 10, wherein the content is captured using a camera, and the circuitry is configured to:
    store the captured content before providing the captured content over the first network path;
    provide the representation of the captured content over the second network path;
    receive a release signal over the second network path; and
    in response to the release signal, provide the captured content over the first network path.

15. An apparatus according to clause 10, comprising circuitry configured to:
    create editing instructions when generating the edited version of the received representation of the content; and
    edit the captured content on the basis of the created editing instructions.

16. An apparatus according to clause 15, wherein the creating editing instructions is performed on edge computing.

17. An apparatus according to clause 10 wherein either one or both of the first and second network paths are across a telecommunications network.

The invention claimed is:

1. A method of providing edited media content comprising:
   generating captured content and a representation of the captured content within a camera at a same time as capturing the content, the representation of the captured content having a smaller size than the captured content;

providing the captured content over a first network path across a network and the representation of the captured content over a second network path across the network, the first and second network paths being different network slices such that the first network path has a higher latency and a higher bandwidth than the second network path;

generating an edited version of the received representation of the captured content;

providing an edited version of the captured content, the editing of the captured content being based on the editing of the representation of the captured content; and communicating at least one of audio for an operator of a camera and control information for the camera over the second network path, which is used to communicate the representation of the captured content, wherein the content is captured using the camera, wherein the representation of the captured content that is generated within the camera at the same time as capturing the content is generated independently from the captured content, wherein the method further comprises:

storing the captured content before providing the captured content over the first network path;

providing the representation of the captured content over the second network path;

receiving a release signal over the second network path; and in response to the release signal, providing the captured content over the first network path.

2. The method according to claim 1, comprising:

providing metadata with both the captured content and the representation of the captured content, the metadata being used to associate the captured content with the corresponding representation of the captured content.

3. The method according to claim 1, comprising:

creating editing instructions when generating the edited version of the received representation of the content; and editing the captured content on the basis of the created editing instructions.

4. The method according to claim 3, wherein the creating editing instructions is performed on edge computing.

5. The method according to claim 1, wherein either one or both of the first and second network paths are across a telecommunications network.

6. A non-transitory computer readable storage medium storing instructions which, when executed by a computer, cause the computer to perform:

generating captured content and a representation of the captured content within a camera at a same time as capturing the content, the representation of the captured content having a smaller size than the captured content;

providing the captured content over a first network path across a network and the representation of the captured content over a second network path across the network, the first and second network paths being different network slices such that the first network path has a higher latency and a higher bandwidth than the second network path;

generating an edited version of the received representation of the captured content;

providing an edited version of the captured content, the editing of the captured content being based on the editing of the representation of the captured content; and communicating at least one of audio for an operator of a camera and control information for the camera over the second network path, which is used to communicate the representation of the captured content, wherein the content is captured using the camera, wherein the representation of the captured content that is generated within the camera at the same time as capturing the content is generated independently from the captured content, and wherein the computer is further caused to perform:

storing the captured content before providing the captured content over the first network path;

providing the representation of the captured content over the second network path;

receiving a release signal over the second network path; and in response to the release signal, providing the captured content over the first network path.

7. An apparatus for providing edited media content, the apparatus comprising circuitry configured to:

generate captured content and a representation of the captured content within a camera at a same time as capturing the content, the representation of the captured content having a smaller size than the captured content;

provide the captured content over a first network path across a network and the representation of the captured content over a second network path across the network, the first and second network paths being different network slices such that the first network path has a higher latency and a higher bandwidth than the second network path;

generate an edited version of the received representation of the captured content; and provide an edited version of the captured content, the editing of the captured content being based on the editing of the representation of the captured content, wherein the content is captured using a camera, and the circuitry is configured to:

communicate at least one of audio for an operator of the camera and control information for the camera over the second network path, which is used to communicate the representation of the captured content, wherein the representation of the captured content that is generated within the camera at the same time as capturing the content is generated independently from the captured content, and wherein the circuitry is further configured to:

store the captured content before providing the captured content over the first network path;

provide the representation of the captured content over the second network path;

receive a release signal over the second network path; and in response to the release signal, provide the captured content over the first network path.

8. The apparatus according to claim 7, wherein the circuitry is configured to:

provide metadata with both the captured content and the representation of the captured content, the metadata being used to associate the captured content with the corresponding representation of the captured content.

9. The apparatus according to claim 7, and the circuitry is configured to:

create editing instructions when generating the edited version of the received representation of the content; and edit the captured content on the basis of the created editing instructions.

10. The apparatus according to claim 9, wherein the creating editing instructions is performed on edge computing.

11. The apparatus according to claim 7, wherein either one or both of the first and second network paths are across a telecommunications network.

* * * * *